(12) United States Patent
Seigneret et al.

(10) Patent No.: US 8,463,865 B2
(45) Date of Patent: Jun. 11, 2013

(54) VIDEO SYNCHRONIZATION WITH DISTRIBUTED MODULES

(75) Inventors: Franck Seigneret, Saint Jeannet (FR); Claude Marescot, Valbonne (FR); Seyed Karim Djafarian Tehrani, Vence (FR); Maija Kuusela, Mouans-Sartoux (FR); Alain Bruno Chateau, Cagnes sur Mer (FR)

(73) Assignee: Texas Instruments Incorporated, Dallas, TX (US)

( * ) Notice: Subject to any disclaimer, the term of this patent is extended or adjusted under 35 U.S.C. 154(b) by 205 days.

(21) Appl. No.: 12/764,448

(22) Filed: Apr. 21, 2010

(65) Prior Publication Data

US 2011/0225256 A1 Sep. 15, 2011

(30) Foreign Application Priority Data

Mar. 9, 2010 (EP) .................................. 10 290 116

(51) Int. Cl.
*G06F 15/16* (2006.01)
*G06F 15/173* (2006.01)

(52) U.S. Cl.
USPC ............ 709/207; 709/223; 709/224; 709/248

(58) Field of Classification Search
USPC .................. 375/140, 219, 298, 359; 717/127, 717/217; 719/310; 709/207, 223, 224, 248
See application file for complete search history.

(56) References Cited

U.S. PATENT DOCUMENTS

| | | | | |
|---|---|---|---|---|
| 4,980,857 | A * | 12/1990 | Walter et al. ................... | 719/310 |
| 8,023,557 | B2 * | 9/2011 | Constantinidis et al. ..... | 375/219 |
| 8,050,313 | B2 * | 11/2011 | Constantinidis et al. ..... | 375/219 |
| 2009/0168848 | A1 * | 7/2009 | Constantinidis et al. ..... | 375/140 |
| 2009/0168849 | A1 * | 7/2009 | Rouxel ........................... | 375/140 |
| 2009/0168939 | A1 * | 7/2009 | Constantinidis et al. ..... | 375/359 |
| 2011/0239196 | A1 * | 9/2011 | Ichard ........................... | 717/127 |
| 2011/0305300 | A1 * | 12/2011 | Ko ................................. | 375/298 |

* cited by examiner

*Primary Examiner* — Quang N Nguyen
(74) *Attorney, Agent, or Firm* — Ronald O. Neerings; Wade James Brady, III; Frederick J. Telecky, Jr.

(57) ABSTRACT

A digital system is provided that includes a number of hardware accelerators. Each hardware accelerator is paired with a synchronization module that is configured to determine when a scheduled task can be started. Each synchronization module includes a network interface configured to send and receive messages to and from other synchronization modules and a configuration interface configured to receive task information from a host processor. Each synchronization module also includes a task scheduler configured to select a task in response to a received message and a task processor interface configured to initiate the selected task on a hardware accelerator coupled to the synchronization module.

18 Claims, 15 Drawing Sheets

VIDEO SYNCHRONIZATION WITH DISTRIBUTED MODULES

CLAIM OF PRIORITY UNDER 35 U.S.C. 119(a)

The present application claims priority to and incorporates by reference European Application number EP 10 290 116.2 (attorney docket TI-67121, filed 9 Mar. 2010, entitled "Video Synchronization with Distributed Modules."

FIELD OF THE INVENTION

This invention generally relates to multi-processing and more particularly to a synchronization module for hardware accelerators.

BACKGROUND OF THE INVENTION

Typically, a video processing solution is composed of hardware accelerators (HWAs), connected to a central programmable unit (CPU) that is in charge of initializing and starting the different hardware accelerators along with managing all their input/output data transfers. As the image resolutions to be processed become higher and video standards become more complex, the number of hardware accelerators needed to support such features may increase. Thus the task scheduling on the different HWAs may become a bottleneck that requires increased processing capabilities in the CPU. Increasing performance of the CPU may be detrimental to size and power usage.

In a typical implementation of a centralized system, all nodes are activated and controlled by the central CPU. Data can be exchanged between nodes and the CPU either by a common memory or by DMA (direct memory access). The CPU typically responds to interrupt requests from the various HWAs to schedule tasks. In a centralized implementation, the synchronization time for a given HWA usually depends on the processor interrupt latency and the explicit or implicit priority assigned to this HWA. When each HWA is connected to a distinct interrupt line with an associated priority, explicit priority exist, and when the interrupt line is shared, the order of processing interrupts will create implicit priority. Thus, the synchronization time is hard to predict.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
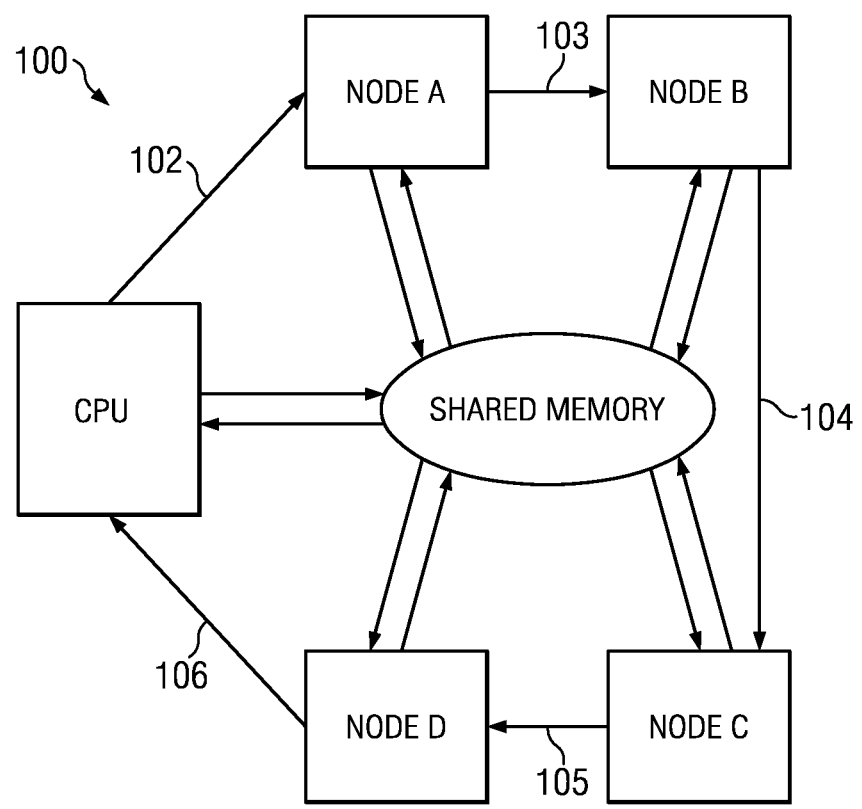
FIG. 1 is a block diagram of an exemplary system that uses distributed synchronization.

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Synchronization of hardware accelerators (HWA) is performed by a distributed synchronization scheme. A synchronization module, referred to herein as the "syncbox," is coupled to each HWA to form a distributed architecture. Each HWA block has its own dedicated synchronization module, which is capable of receiving activation events and conditions from other syncboxes, of scheduling the activation of a task on the attached HWA and of signaling activation conditions to other HWAs as a result of the task completion. Synchronization is based on message-passing principles. All syncboxes are connected to an OCP (open core protocol) network and have an input port where they receive messages and an output port to send messages. Syncbox modules offer a level of programmability to fit with the processing flow by indicating how many activation messages are expected, which HWA(s) is (are) originator(s), and which HWA(s) is (are) the successor (s). In this embodiment for video processing, initialization of the syncboxes is made at video frame level only to avoid adding overhead at each call on the Macro-Block level.

The syncbox modules provide a small and low-variance overhead time for the synchronization task. In a centralized implementation, the synchronization time for a given HWA usually depends on the processor interrupt latency and the explicit or implicit priority affected to each HWA and is therefore hard to predict. In a system based on syncbox modules, this time is very low. Small variations may occur due to the propagation time of the message on the OCP network that depends on the amount of simultaneous messages which can transit on the network at the same time.

Furthermore, various embodiments of the syncbox may offer a level of programmability in order to support different data processing implementations, such as different standards, encode or decode, etc.

FIG. 1 is a block diagram of an exemplary system 100 that uses distributed synchronization. In this embodiment of the invention, the CPU is the entry and exit point in a loop composed of several nodes. Each node includes a synchronization module configured to send and receive messages. Each node is able to activate its successor without CPU intervention. The CPU and Nodes may exchange their data by the shared memory module or by an external memory module, for example.

For example, the CPU may send an activation message 102 to node A. Node A processes a task on a block of data in the shared memory and then sends an activation message 103 to node B. Node B processes a task on the block of data in the shared memory and then sends an activation message 104 to node C. Node C processes a task on the block of data in the shared memory and then sends an activation message 105 to node D. Node D processes a task on the block of data in the shared memory and then sends a completion message 106 to the CPU. In a simple scheme, the CPU may wait until receipt of completion message 106, until it sends another activation message 102 to node A to cause node A to begin processing another block of data in the shared memory. In this manner, the CPU is not burdened with keeping track of the progress of the processing being performed by the nodes.

In order to further improve processing time, the CPU may periodically send activation messages 102 to node A, rather than waiting for completion message 106. In one embodiment, each node acknowledges activation messages when the node is able to process it. Typically, the CPU would not send another activation message until the node has acknowledged the last one. Alternatively, in another embodiment, if a node cannot accept the activation message, it may respond to the activation message with an error response. In this manner, overlapped, pipelined operation of the various nodes may result.

In one embodiment, the messages 102-106 may be sent via dedicated point to point links between the nodes and CPU. In another embodiment, the messages may be sent via a common bus between the nodes and CPU using an addressing scheme, for example. In some embodiments, the messages may be transferred using the same bus as is used for accesses to the shared memory or registers, while in other embodiments there may be separate buses for message and data transfers.

Figure 2:
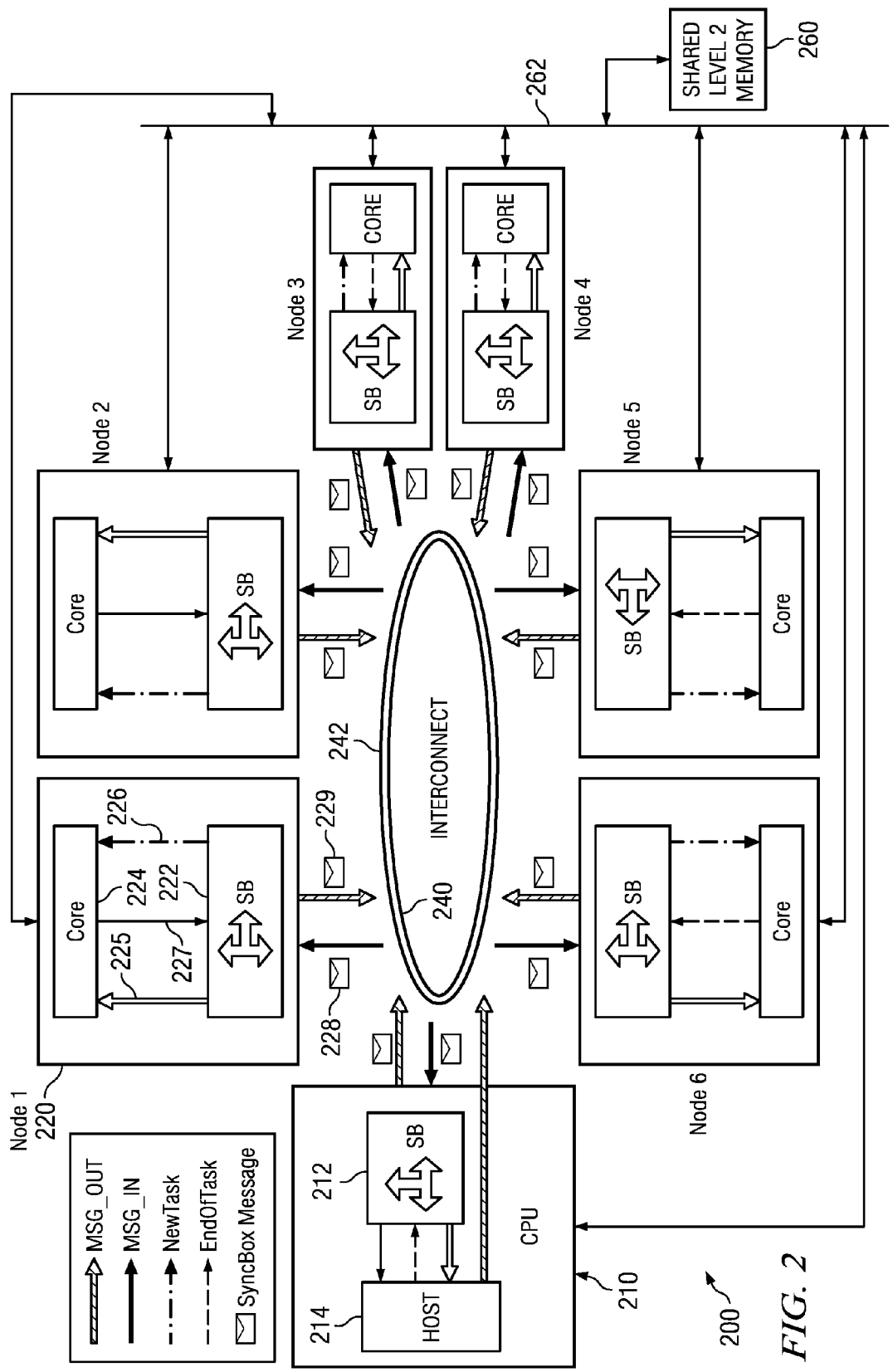
FIG. 2 is a more detailed block diagram of an exemplary system with distributed synchronization that illustrates message flow among nodes of the system.

FIG. 2 is a more detailed block diagram of an exemplary system with distributed synchronization that illustrates message flow among nodes of the system. In this embodiment of invention, a CPU 210 is coupled to several hardware accelerator nodes, such as node 220. All of the nodes and CPU are connected to event network 240 where all messages are issued for transfer to their destination node. In this embodiment, event network 240 is a 16-bit bus. Also, all of the nodes and CPU are connected to configuration network 242: the configuration network is used by the CPU for 2 purposes. It is used to set-up the configuration registers of the nodes at the beginning of a frame or slice (or after an exceptional event detection) in order to define the video codec constant parameters (standard, encode or decode, etc), the activation topology of the network (Syncbox source event triggers), the activation parameter addressing algorithm (syncbox parameter address registers); Network 242 is also used by the CPU to directly post messages to recipients in the nodes of the system. In this embodiment, configuration network 242 is a 32-bit bus. In this embodiment, some or all of the nodes may also be connected to a low latency high bandwidth shared level 2 (SL2) memory 260 via a SL2 interface (SL2IF) interconnect 262. SL2 memory 260 may be used for holding blocks of data that are being intensively manipulated by multiple nodes at different stage of the processing without a need for copying data from one node internal memory (level 1 memory) to another node internal memory.

In this embodiment, CPU 210 includes a processor 214 that is referred to as a host processor since it manages system 200. CPU 210 also includes a syncbox 212 that handles synchronization messages directed to and from the CPU. Syncbox 212 is connected both to event network 240 and to configuration network 242.

Node-1 220 contains a syncbox module 222 and a core processor module 224. Syncbox 222 is connected to event network 240 and to configuration network 242. Core processor 224 is controlled by syncbox 222. When syncbox 222 receives an activation message 228 from the event network, it sends a new task signal 226 to core processor 224 when all conditions have been met. In response to receiving a new task signal 226 from syncbox 222, core processor 224 performs a processing task on a block of data. The block of data may be partly or fully located in the SL2 memory. Alternatively, in some system, if node 220 has internal memory, then the data may have been partly or fully moved to internal memory before the activation message 228 is received by the node 220 syncbox 222. This latter case illustrate a system where for instance, a direct memory access (DMA) engine may be used to transfer block of data between memories external to the node (SL2, off chip memory, etc) and memories internal to the node. In such system, a DMA engine will be associated to a Syncbox in order to be able to send the activation message 228 when the data transfer is completed. In such system, the node having a DMA engine will also preferably have a direct access to the internal memory of Node 220, therefore making the internal memory of node 220 be shared by 2 nodes of the system; alternatively, for low traffic cases, the node having a DMA engine will move the block of data via the configuration network 242 and the node 220 internal bus 225. Once the processing task is complete, core processor 224 sends an end of task signal 227 to syncbox 222. Syncbox 222 then sends a message 229 to one or more other nodes in the system to indicate the current node 220 task has been completed.

Each of the other nodes 2-5 are similar to node-1 220 and contain a dedicated syncbox module. Each node also contains some sort of processor core; however, the processor cores may be different and each may be tailored to perform a particular processing task. In this manner, a large number of nodes that perform independent processing may be synchronized without burdening host processor 214 of CPU 210.

The task corresponds to the smallest processing granularity. For an embodiment of a video accelerator, which will be described in more detail, the typical level of granularity is the macro-block (MB). While the MB is the finest granularity, multiple tasks can be activated on two or more MBs. A task always ends with a End of Task signal at the end of the execution and is equivalent to the commonly used end of process interrupt. Simple events are sent to all relevant accelerators as a notification of the task completion that can also be interpreted as the next task activation. A task is triggered after multiple conditions are detected and all satisfied.

Each Syncbox has a port dedicated to the message reception and another port dedicated to the message transmission. In some embodiments, such as a CPU based node, it may also be possible to directly write a message in a Syncbox register using the configuration network.

There is at least one task per node. Each embodiment will have a maximum number of tasks that can be active, for example, in this embodiment the maximum is fixed to sixteen. Each node has one TaskList Register file containing task specific registers.

A Syncbox may receive several activation messages from the same source node prior to all conditions being satisfied when the task can be scheduled. Every time an activation message is received, an associated activation counter is incremented. There is one activation counter per activator node. Acknowledgement messages are sent by the Syncbox upon activation message reception when the activation counter is not equal to its maximal value. Acknowledgement messages are sent to inform the activator(s) there is still room to receive a new activation message.

Asynchronous Message:

During the task processing time, the node core can raise a signal to inform another node a specific asynchronous event has occurred (buffer full/empty, error, etc). When this signal is detected, the Syncbox sends a message to a pre-defined node that was programmed at set-up time. Syncbox offers multiple lines of asynchronous events. Different asynchronous events are mapped to different tasks on CPU based nodes. The mapping is established by the user at the configuration time. For example, an asynchronous task may have several activators, but not all must occur to trigger the task. Similarly, it may be configured so that only one activation message is needed to activate the task.

Error Detection

Unwanted messages and incoherent configurations can be detected by the Syncbox. When an error is detected, an error log register is updated with a specific error code. In this embodiment, only one error is logged prior to a software clear, however, in another embodiment more than one error might be logged. An activation message is sent to a destination node in charge of processing the errors (CPU based node). The node and task identifier of the node in charge of processing the asynchronous events are programmable at setup time.

Figure 3:
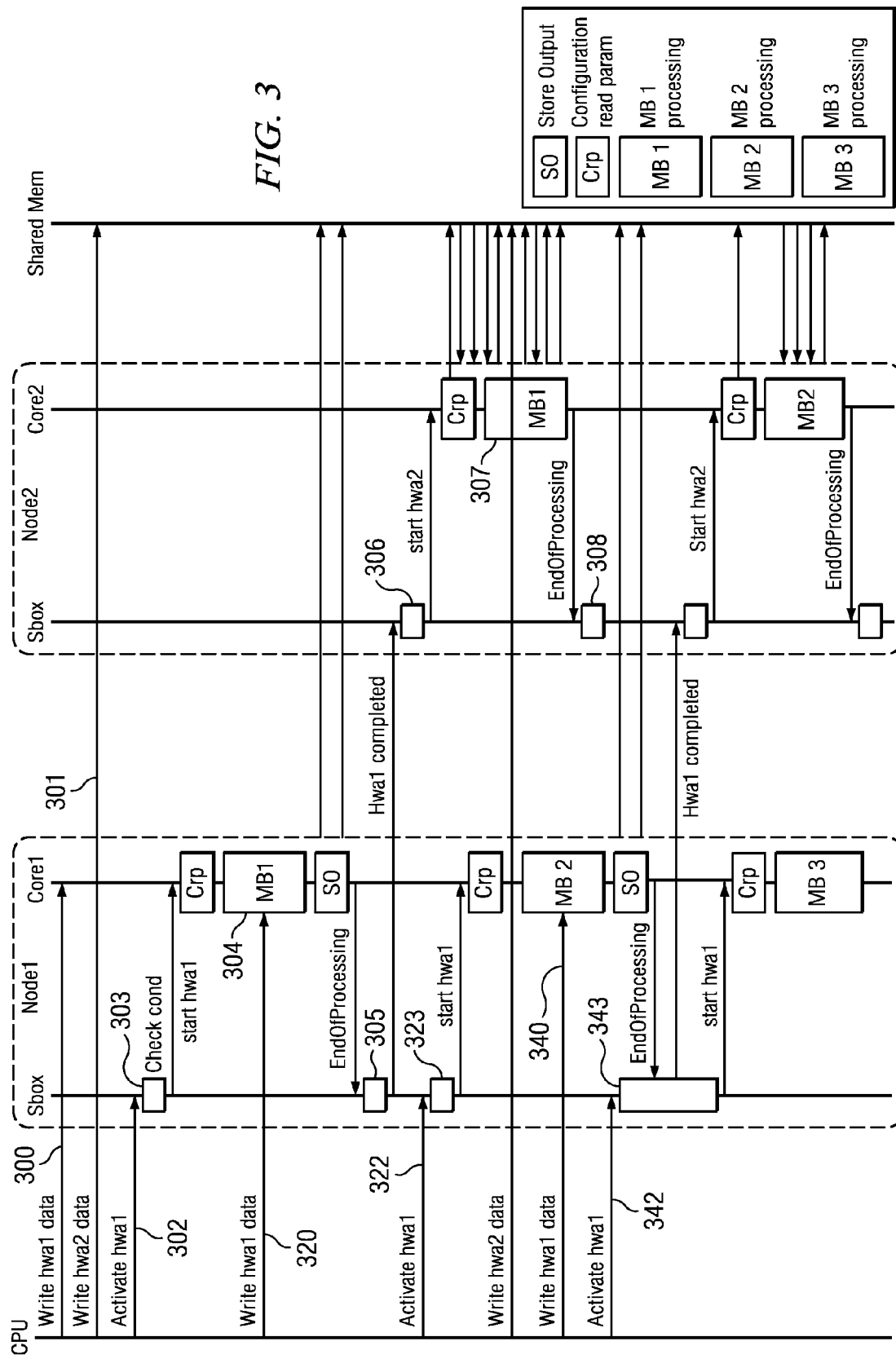
FIG. 3 is ladder diagram illustrating message traffic in the exemplary system of FIG. 2.

FIG. 3 is ladder diagram illustrating message traffic in the exemplary system of FIG. 2. In this illustration, Node-1 refers to a hardware accelerator (hwa1) that has internal memory and node-2 refers to a hardware accelerator (hwa2) that uses only shared memory. However, in other embodiments the use of internal memory may vary. In this example, macroblocks (MB) of video data are being processed, where each MB is a 16×16 set of pixels. It is to be understood that this is only an example; other embodiments of the invention may be designed to process various types of data.

In this example, MB1 (hwa1_data) is written 300 to the internal memory of node 1 and data (hwa2_data) for node 2 is written 301 to shared memory. The CPU then sends an activate message 302 to node 1. The syncbox in node 1 then checks 303 to make sure all conditions are satisfied and then asserts a "start hwa1" signal to the processor core of node 1 when all conditions are satisfied. The processor core reads configuration parameters, and MB1 is then processed 304 by node 1 and the results stored in shared memory. When complete, the core asserts an "end of processing" signal to the syncbox which sends 305 a "hwa1 completed" message to node 2 and then waits for the next command message.

Upon receipt of the "hwa1 completed" message from node 1, the syncbox of node 2 then asserts 306 a "start hwa2" signal to the core processor of node 2 if all conditions are met. The core reads configuration parameters, and the first MB is then processed 307 by node 2. In this example, the data for node 2 is in SL2 memory since node 2 does not have internal memory, therefore the core processor of node 2 must access SL2 memory for MB1 data. When complete, the core asserts an "end of processing" signal to the syncbox of node 2 and it then waits 308 for the next start hwa2 signal from its syncbox. If other nodes are involved in processing MB1, then a "hwa2 complete" message would be sent to the next node.

Meanwhile, the CPU may send 320 MB2 data to node 1. If It sends 322 the next "activate hwa1" message to node 1 after the syncbox of node 1 receives 305 the "end of processing" signal, then the syncbox of node 1 can immediately assert 323 the "start hwa1" to initiate processing of MB2 data. Processing then proceeds as above for MB2 data in a pipelined manner.

The CPU may send 340 MB3 data to node 1, and then send 342 an "activate hwa1" prior to when the syncbox of node 1 receives the "end of processing" signal from the core of node 1. In this case, the syncbox waits 343 until the end of processing condition is met, then asserts 343 the "start hwa1" signal to initiate processing of MB3.

Processing continues in this manner with all synchronization between node 1 and node 2 handled by the respective syncboxes of node 1 and node 2. In this manner, the CPU is not burdened with maintaining synchronization between the various hardware accelerator nodes of the system.

Figure 4:
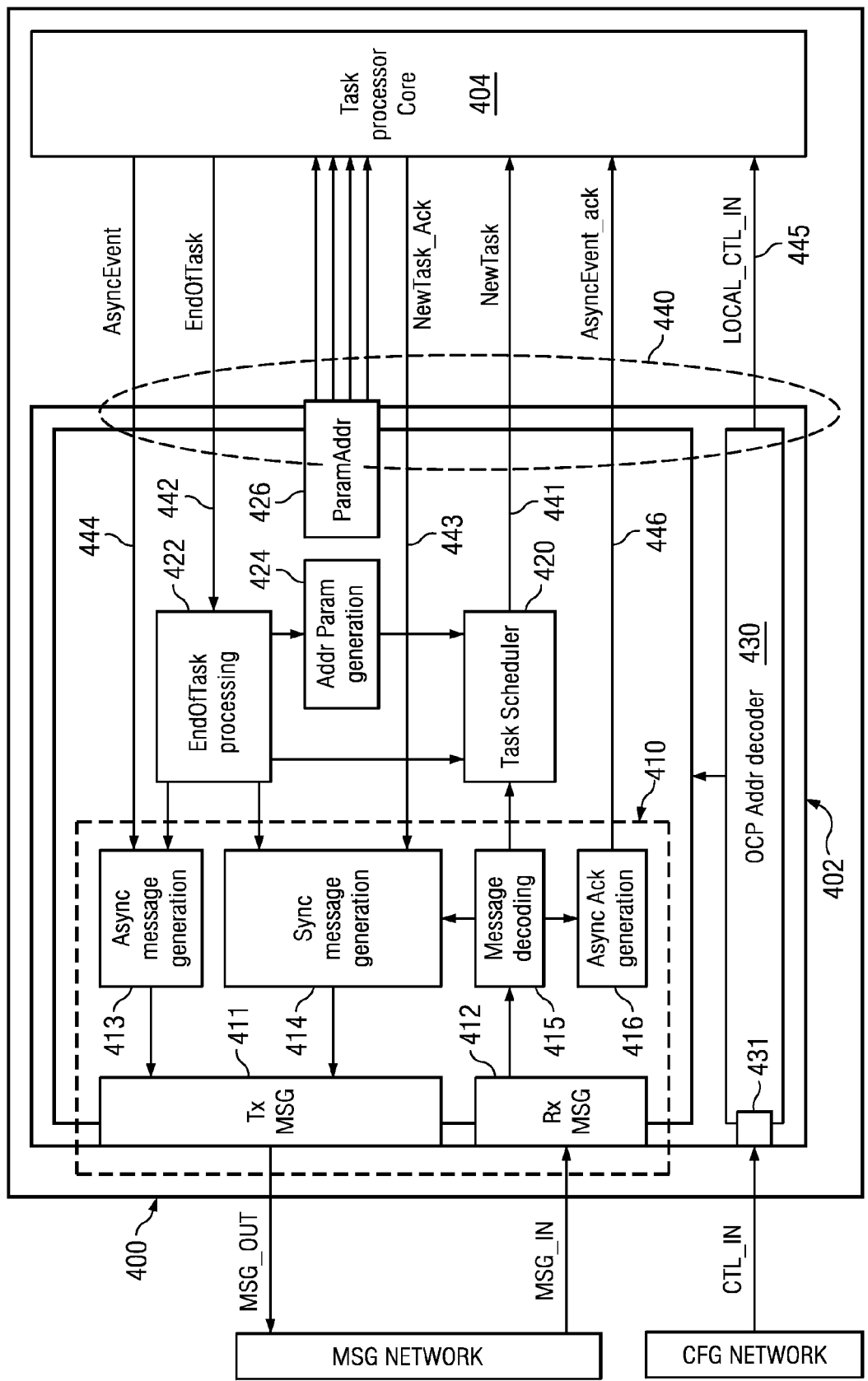
FIG. 4 is a block diagram illustrating an exemplary synchronization module for use in a system with distributed synchronization.

FIG. 4 is a block diagram illustrating an exemplary synchronization module 402 for use in a system with distributed synchronization. Syncbox 402 is coupled to processor core 404, which is configured to perform one or more tasks on blocks or streams of data. Typically, task processing core 404 is designed and optimized for a particular type of processing, such as for macro block processing in a video system, however in some embodiments it may be a general purpose processor, or a specific purpose processor such as a digital signal processor, for example. Together, embodiments of syncbox 402 and processor core 404 form the hardware accelerator nodes of FIG. 1 and FIG. 2, for example.

Syncbox 402 includes a configuration network interface 430 that is routing configuration information to the syncbox core or to the task processor core 404, a messaging network interface 410 that is configured to send and receive messages to and from other nodes of the system described on FIGS. 1 and 2, a task scheduler 420 that is configured to select a task in response to one or more received messages, a task processor interface 440 that provides and collects task information signals to the task processor 404.

The messaging network interface 410 includes asynchronous message generation logic 413, synchronous message generation logic 414, transmission message port 411, received message decoder logic 415, asynchronous acknowledgement logic 416 and received message port 412. Port connectors 411 and 412 are designed to provide a physical connection to a message network, such as message network 240 of FIG. 2. Various embodiments of syncbox 402 may implement various types of connections, depending on the message network structure of the system that will be using syncboxes. For example, messages may be conveyed on a serial bus or a parallel bus. The message network may have a shared parallel topology, a ring topology, a star topology, or other types of known network topologies.

The message receive port is used to receive activation and acknowledgement messages from other nodes. MSG_IN port 412 is a slave interface, 16-bits wide, write-only. Input messages are stored in an RxMsg register within message receive port 412 that holds each received message. In this embodiment, the RxMsg register is 16 bits. The RxMsg register is accessible from both the message input port 412 and the control input port 431. The message input port 412 is used when the system is functioning in the pipelined processing of sending and receiving activation messages. The control input port 431 is used when the system is under initialization phase and that activation messages are being posted by the CPU 210 of FIG. 2 to reset ownership of the shared resources (blocks of data in memory, etc) between each two data dependent nodes of the system; the ownership of the shared resources is given to the data producer nodes by programming the CPU 210 of FIG. 2 to send activation messages to the data producer node on behalf of the data consumer node. Message decoding logic 415 decodes each received message and updates task scheduler logic 420 accordingly. In case of Asynchronous Acknowledge message reception, asynchronous event acknowledgement signal are asserted to the task processor 404 via Async Ack Generation logic 416 and via the task processor interface 440.

The message output port is used to send activation and acknowledgement messages to other nodes. In this embodiment, the message output port is a master interface, 16-bit wide, write-only. The MSG_OUT interface is shared between all tasks. Prior to being sent, the messages are stored in a TxMsg register within output port 411. Synchronous messages are generated in message generation logic 414 and have the general form defined in Table 1. Asynchronous messages are generated in message generation logic 413 and have the general form defined in Table 2.

TABLE 1 bit-field synchronous message description

| Bits position | description |
|---|---|
| b0-b3 | source node index. Gives the identifier of the node who has sent the activation message |
| b4-b7 | source task index: Give the task identifier to which the acknowledge message must be sent to. |
| b8-b11 | destination task index. Gives the identifier of the task to be activated on the destination node |
| b12 | Synchronous/asynchronous signal. set to 0 for synchronous message |
| b13 | Activation or Acknowledge, set to 1 for activation, 0 for acknowledge |
| b14 | AckReq: bit set to 1 if a acknowledge message must be sent back upon reception of a synchronous activation message. Set to 0 for fake message to avoid sending acknowledge to CPU node 210 of FIG. 2 in case CPU node sends activation message on behalf of a data consumer node to a data producer node to initialize ownership of shared resources before the pipelined processing starts. Bit is meaningless for acknowledge message. |
| b15 | reserved |

TABLE 2 bit-field asynchronous message description

| Bits position | description |
|---|---|
| b0-b3 | Source node index. Gives the identifier of the node who has sent the activation message |
| b4-b7 | For activation message:<br>Source event index: Give the event identifier to which the acknowledge message must refer to.<br>For acknowledge message:<br>Source task Id: this field contains the id of the task in charge of processing the async event. But meaningless since not checked at destination node. |
| b8-b11 | For activation message:<br>Destination task index. Gives the identifier of the task to be activated on the destination node<br>For acknowledge message:<br>Destination event id; id of the async event line to be acknowledged |
| b12 | Synchronous/ asynchronous signal. set to 1 for asynchronous message |
| b13 | Activation or Acknowledge, set to 1 for activation, 0 for acknowledge |
| b14 | AckReq: bit set to 1 if a acknowledge message must be sent back upon reception of a asynchronous activation message. Meaningless for acknowledge message. |
| b15 | reserved |

Figure 9:
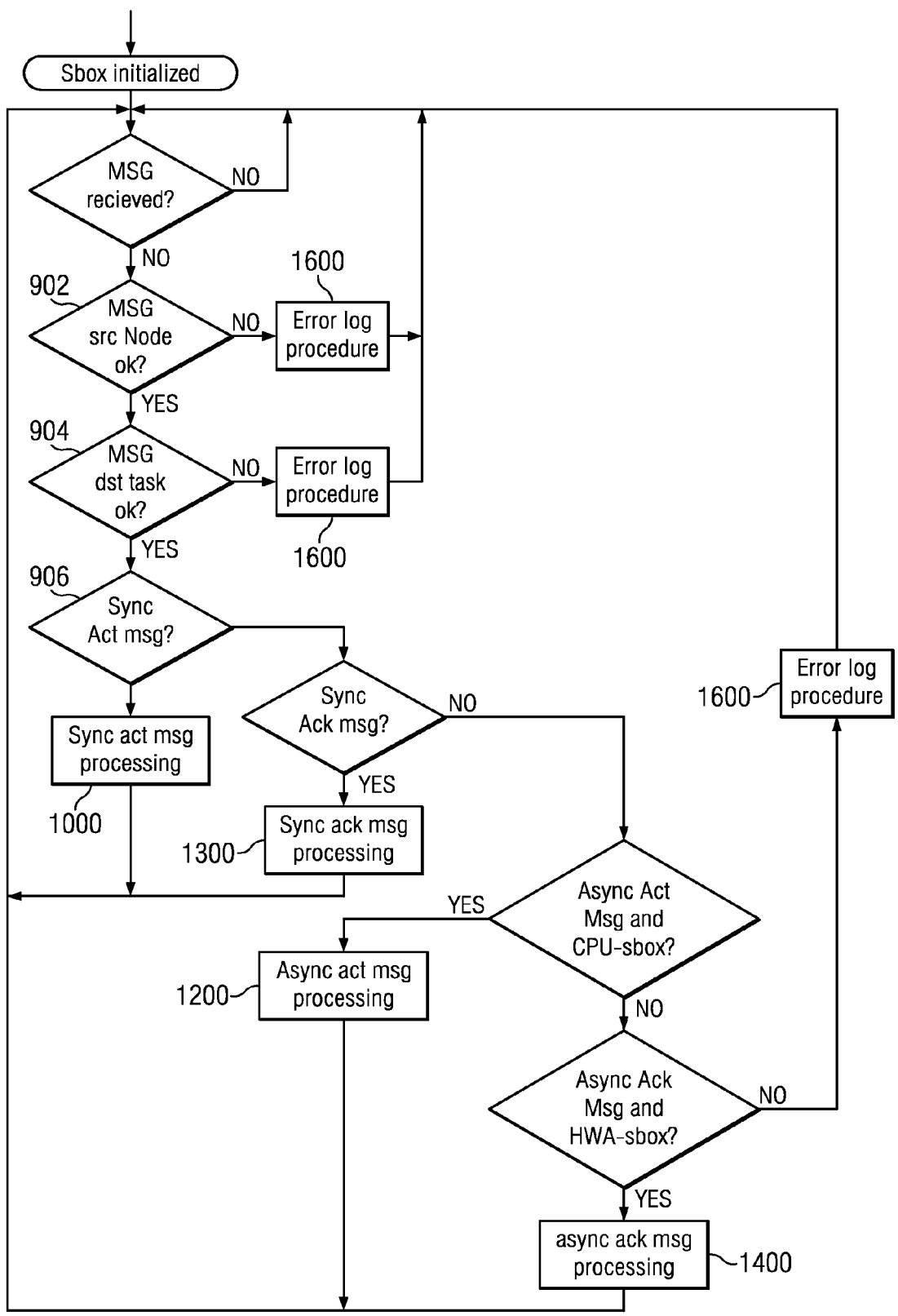
FIGS. 9-16 are flow charts illustrating message processing used in embodiments of the present invention.
Figure 10:
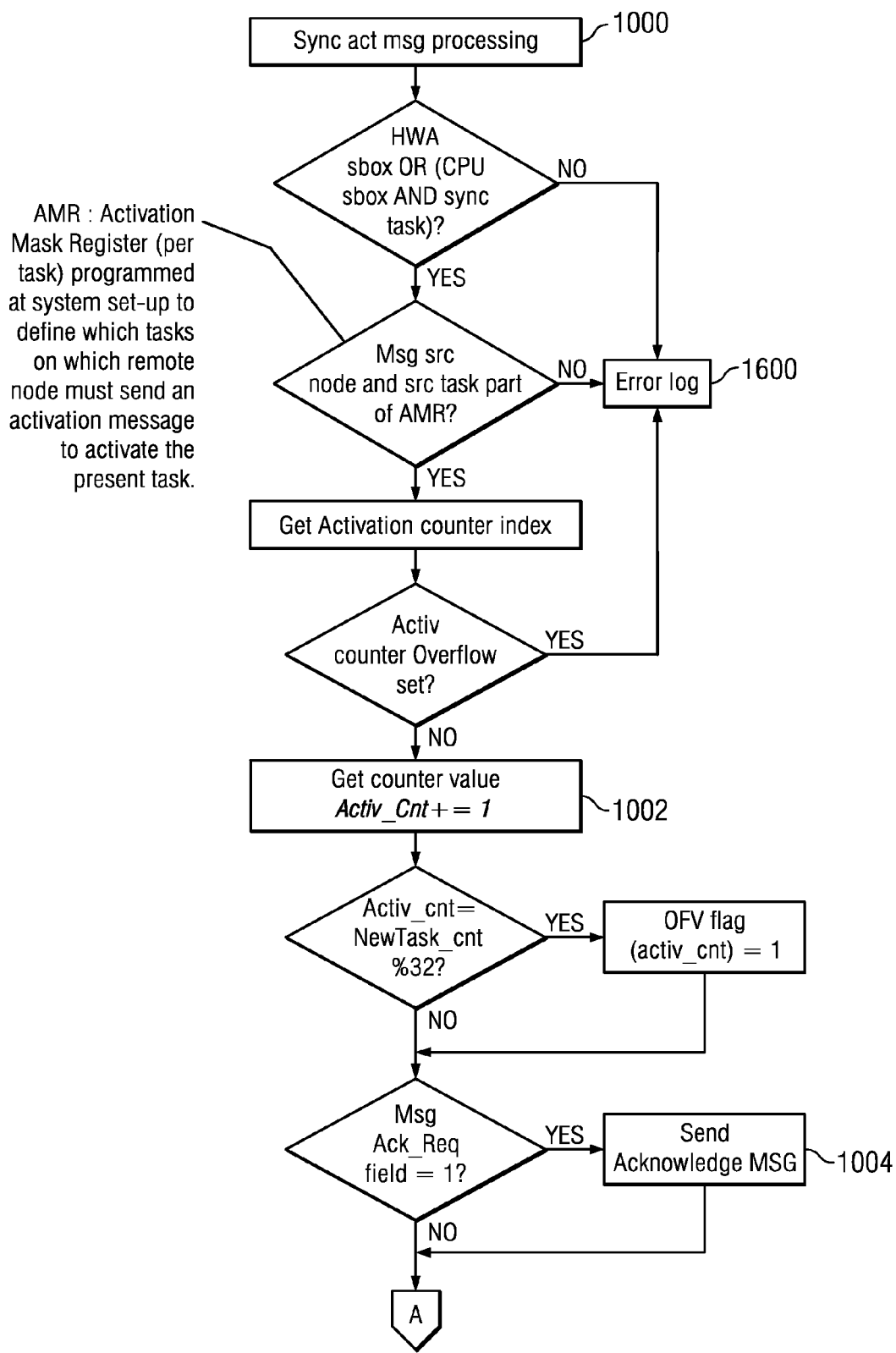
Figure 11:
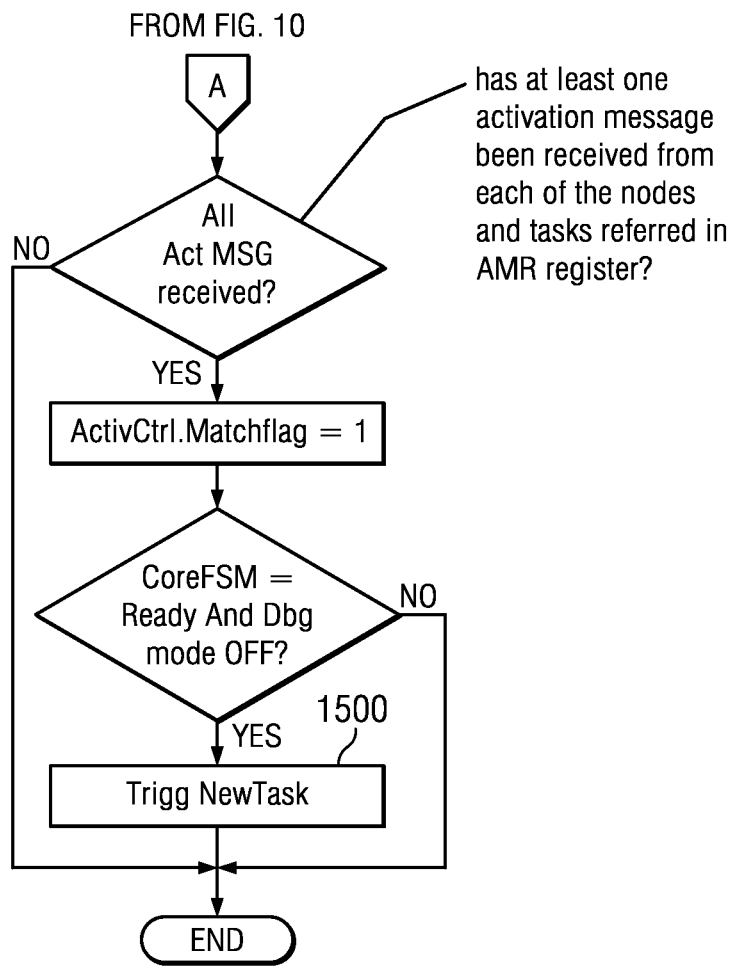
Figure 12:
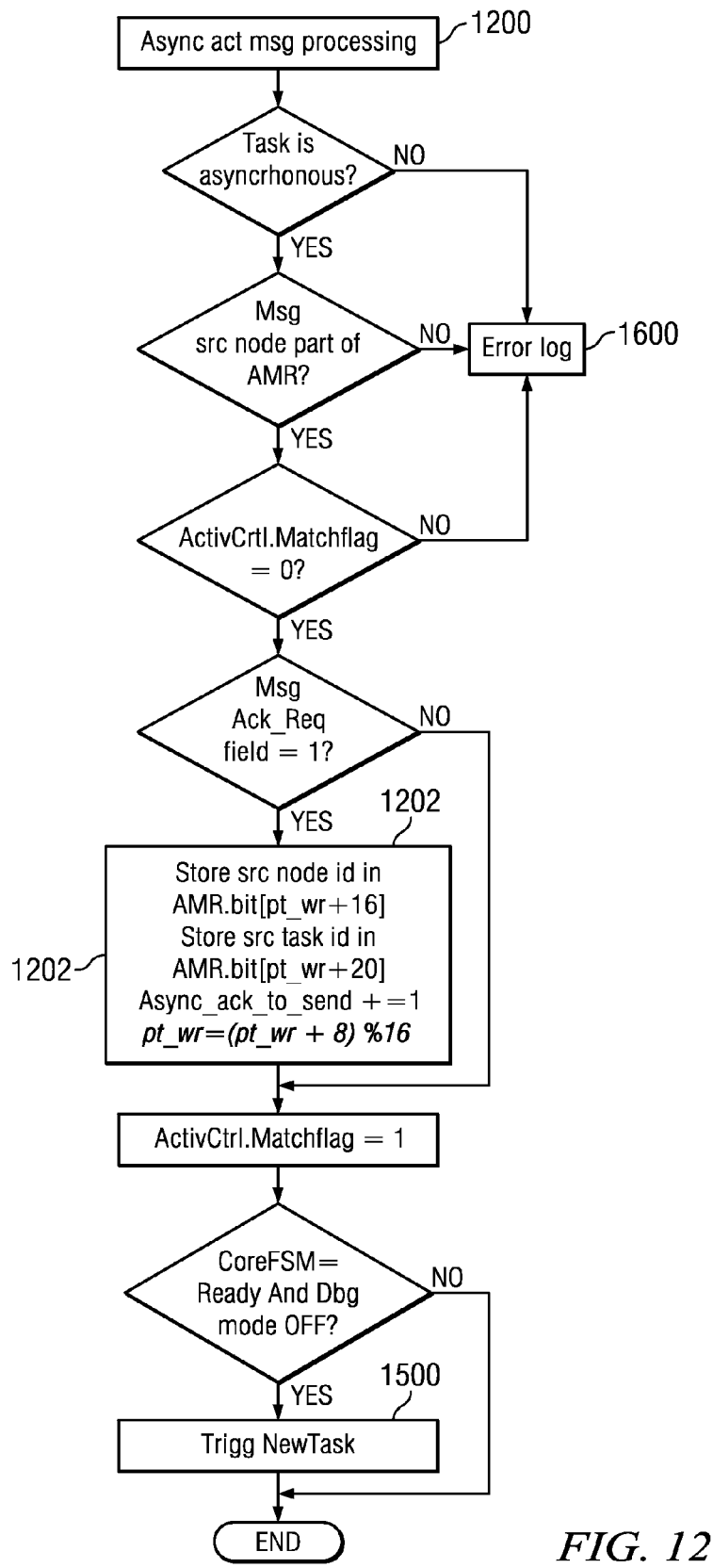
Figure 13:
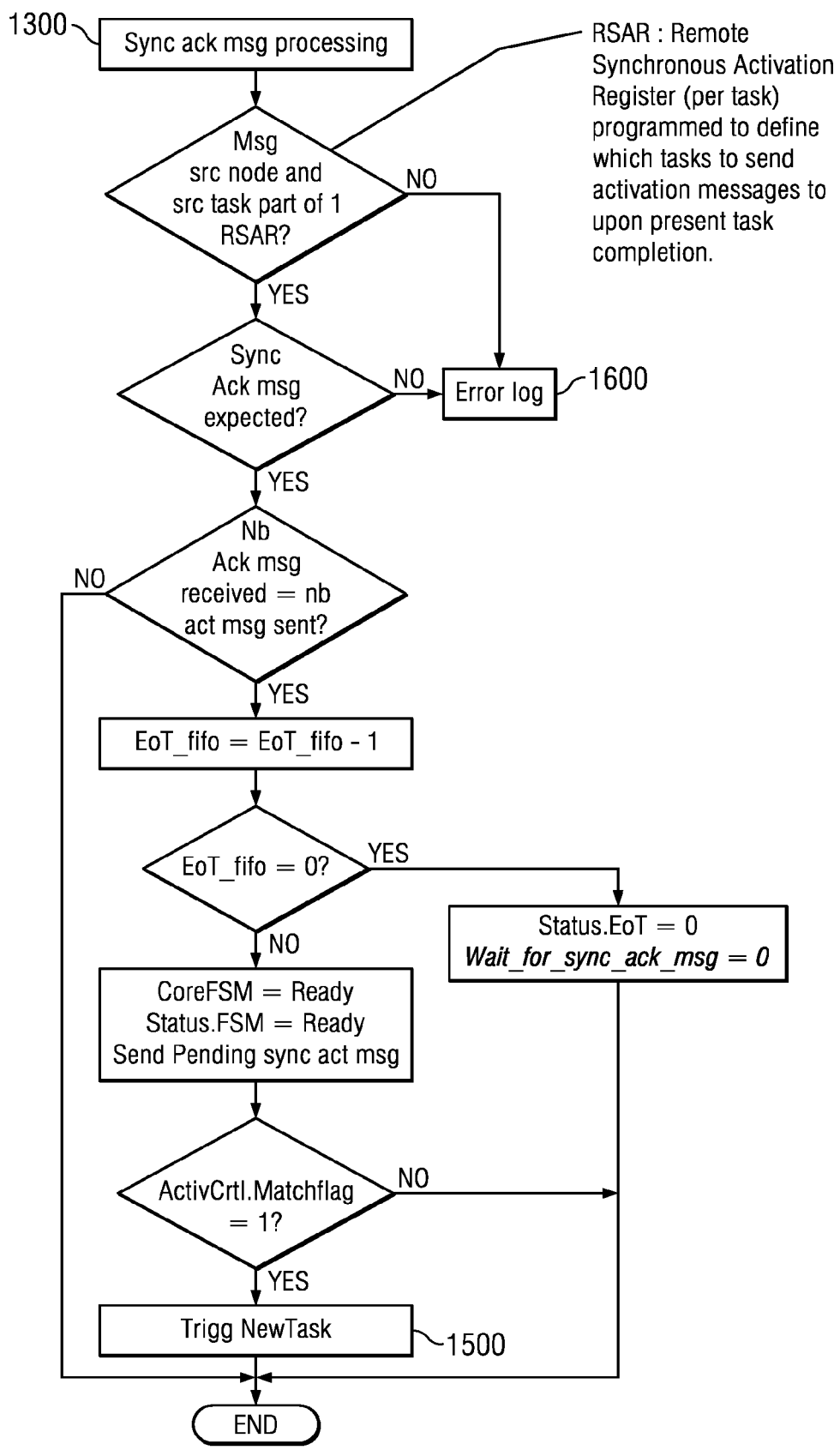
Figure 14:
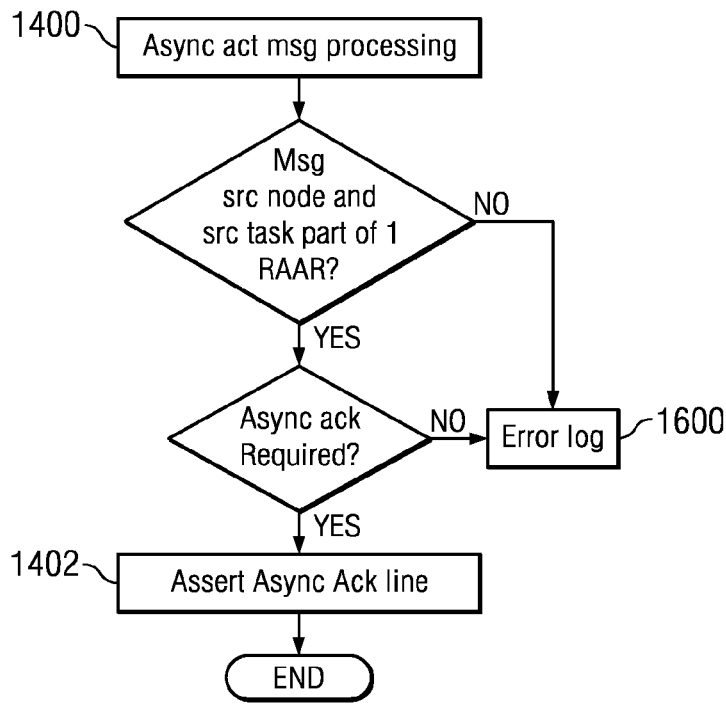
Figure 15:
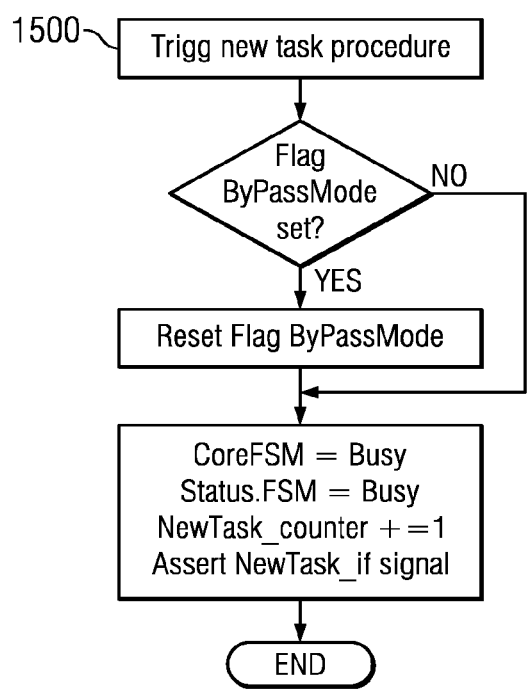
Figure 16:
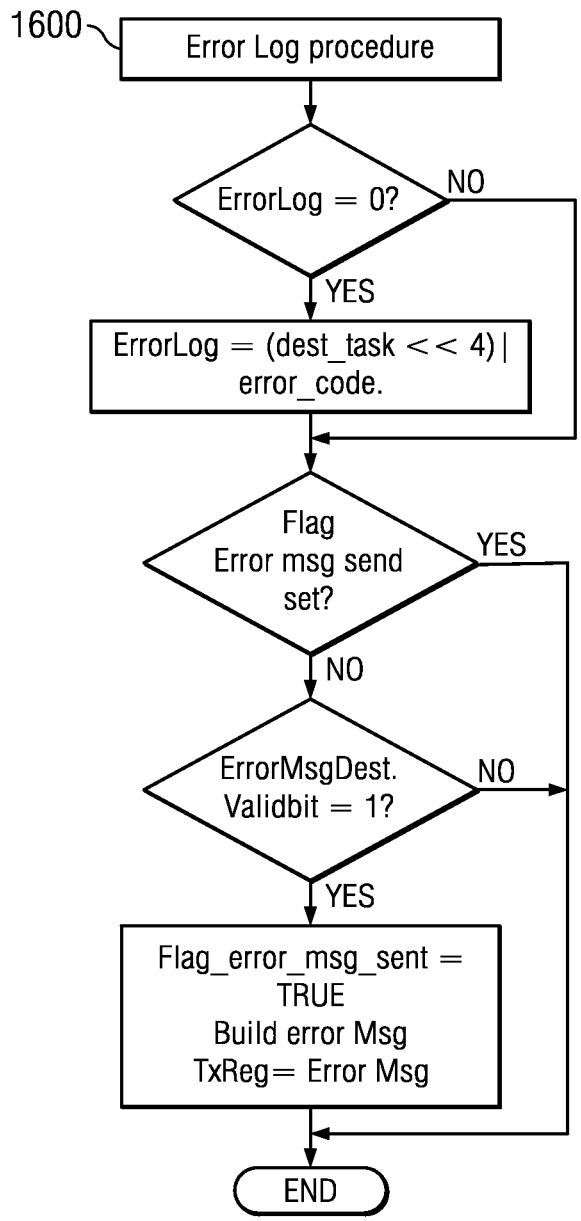

FIGS. 9-16 are flow charts illustrating message processing used in embodiments of the present invention. Table 3 includes pseudo-code that defines the operation of message decoding logic 415 as illustrated also on FIG. 9-16. FIG. 9 illustrates a message reception algorithm. FIG. 10 illustrates synchronous activation message processing 1000 (part 1). FIG. 11 illustrates synchronous activation message processing (part 2). FIG. 12 illustrates asynchronous activation message processing 1200. FIG. 13 illustrates synchronous acknowledge message decoding 1300. FIG. 14 illustrates asynchronous acknowledge message decoding 1400. FIG. 15 illustrates triggering a NewTask procedure 1500. FIG. 16 illustrates the error log procedure 1600.

TABLE 3 message decoding algorithm

First check if the source node field is in the range of supported node. (902)
    If not log error SYNCBOX_MSG_SRC_NODE_NOK and send message to remote node. (1600)
Check if the destination task id is lower than the number of task of the node (904), or if the event id is lower than the number of asynchronous event supported.
    If not log error SYNCBOX_MSG_DEST_TASK_NOK and send message to remote node
If this is a synchronous activation message (906); if so, process synchronous activation message (1000)
    If message is expected (Check if the message comes from an expected node i.e. if the source node
    id and the source task id contained in the message match the values set in the activation mask register).
        Increment by 1 the activation counter corresponding to the source node activator (1002)
        If activation counter associated to the sender is not in overflow.
            If the new counter value match the current NewTaskCounter register value, the
            associated overflow bit is set.
            If the acknowledge is required, generate acknowledge message and send acknowledge
            message to the activator node. (1004)
            If all of the activators bits are different from the NewTask counter register value.
                Set the Match flag bit in activation control register.
                If the Node state is in the Ready state.
                    The NewTask signal is set if the dbg_halt_on signal is not raised
                    and if the ParamAdress_valid bit is set. (1500)
                    The core FSM is toggled to the BUSY state
                    The Match flag bit in activation control register is reset.
                    The NewTaskCounter is increased
        Else if the activation counter is in overflow.
            An error ACT_MSG_AND_ACTIV_CNT_OVFL is logged and an error message is sent.
    Else if the message is not expected.
        Log an error SYNCBOX_ACT_MSG_UNEXPECTED in the error log register. Send a message
        to a node in charge of handling errors (CPU based). (1600)

TABLE 3-continued message decoding algorithm

Else if an asynchronous activation message is received, (1200)
    If the Syncbox type is a CPU based Syncbox and task is programmed as an asynchronous task
    (TasksyncType register).
        If message is expected (Check if the message comes from an expected node i.e. if the source
        node id contained in the message is one of the bit set in the activation mask register).
            Set the Match flag bit in activation control register.
            If the Node state is in the Ready state.
                The NewTask signal is set. (1500)
                The NewTask signal is gated by the dbg_halt_on signal.
                The core FSM is toggled to the BUSY state.
                The Match flag bit in activation control register is reset.
                The NewTaskCounter is increased.
                If the acknowledge is required. (1202)
                    Store the message source task id to the ActivationMask register, bits
                    16-19 or bits 24-27 (these two 4 bits locations are used in ping-pong).
                    Store the message source node id to the ActivationMask register, bits
                    20-23, or bits 28-31 (these two 4 bits locations are used in ping-pong).
            Else, if the FSM is already in the busy.
                If the acknowledge is required.
                    Store the message source task id to the ActivationMask register, bits
                    16-19 or bits 24-27 (these 2 4 bits locations are used in ping-pong).
                    Store the message source node id to the ActivationMask register, bits
                    20-23, or bits 28-31 (these 2 4 bits locations are used in a ping-pong).
        Else (if the message is not expected
            Log an error SYNCBOX_ACT_MSG_UNEXPECTED in the error log register. Send a
            message to a node in charge of handling errors (if Node Id stored in ErrorMsg register
            field is not equal to the NodeId value. (1600)
Else if a synchronous acknowledge-message is received, (1300)
    If the message fields corresponding to the node and task identifiers, match with one of the
    RemoteSyncActMsg register, and if the valid bit is set along with all valid bits of the previous
    RemoteSyncActMsg registers.
        If the number of received ack message is equal to the number of activation messages sent
            If the EndOfTaskfifo flag full was set.
                Send the pending activation message(s).
                Decrease the EndOfTaskFifo value.
            If the activation match flag is set (pending task).
                Reset the activation match flag.
                Toggle the core FSM in the BUSY state.
                Set the NewTask signal. (1500)
                Update the task counter register.
Else if an asynchronous acknowledge-message is received (1400) and If the Syncbox type is a HWA
Syncbox type
    If the AsyncEventAckReq register bit corresponding to the event identifier given by the input message
    files event_id, is equal to 1 and if the message source node and task identifiers are equal to the fields
    stored in the RemoteAsyncActMsg register corresponding to the async line given by the message
    event_id field, and if the event_id value is less then the maximum number of asynchronous lines
    supported by the node:
        the AsyncEvent_ack signal is asserted during 1 cycle. (1402)
    Else
        An error SYNCBOX_UNEXPECTED_ASYNC_ACK_RECEIVED is logged in the error log
        register. Send a message to a node in charge of handling errors .(1600)
Else if the message type is not defined
    An error SYNCBOX_UNSUPPORTED_MSG_RECEIVED is logged in the error log register. Send a
    message to a node in charge of handling errors. (1600)

The control input port is used to receive configuration information from the system host processor. In this embodiment, the control input port is a 32-bit interface. A 32-bit address and 32-bit data value is transferred for each control word. In response to receiving a command word, the on-chip protocol (OCP) address decoder logic 430 decodes the command word and provides an acknowledgement to the host processor to indicate when the command has been processed and to indicate if the command is valid for this node. In this embodiment, Syncbox memory size is limited to 2 Kbyte; therefore only eleven address bits are needed.

Task scheduler 420 receives task activation requests information from input message decoding logic 415, end of task processing information from end of task processing logic 422, and parameter addressing information from parameter address generation logic 424. Once all criteria for a task have been met, the new task signal 441 of task processor interface 440 is asserted to instruct task processor 404 to start the next task. The Syncbox enables the node core to read the task parameter's ParamAddress signal 426 when the new task command 441 is issued.

In order to avoid activating a task while it is still running, a simple two state-finite state machine (FSM) may be implemented. At initialization, the FSM is in the Core_ready state. When the Syncbox sends the new task command 441, the FSM goes into the Core_busy state. As soon as the EndOfTask signal 442 is detected and the EndOfTask FIFO is not full, the FSM goes back to the Core_ready state. For a multi-task node, multiple FSMs are implemented as above, since the FSM applies for each task. Each FSM is handled independently from the others.

The NewTask_Ack signal 443 of interface 440 is used by the node core to acknowledge to the Syncbox that the NewTask Command 441 has been detected and that the task is started. Upon reception of the NewTask_Ack signal 443, the acknowledgement message is sent back to the activator in case the activation counter was at its maximum value.

In this embodiment, the EndOfTask signal 442 of interface 440 is latched in a 2 stage-FIFO EoT_FIFO in end of task processing logic 422. The FIFO pointer is initialized to 0 and is incremented on EndOfTask signal detection. It is decremented when two activities are completed: When all the activation messages have been sent to the nodes programmed to be notified of such end of task and when all the corresponding acknowledgement messages have been received from these nodes. The FIFO allows de-correlation of the actual end of the task on the node task processor core 404 and the communication of the end of task by the node syncbox 402 to the other nodes of a system as illustrated on FIG. 2. For example, it may happen that the activation and acknowledgment messages can not be transmitted due to message network congestions; in such conditions, the node task processor core 404 availability can be exploited while the node syncbox 402 waits for network decongestion to proceed with activation message pool sending and acknowledge message pool reception. In this embodiment, the Syncbox allows a maximum of two tasks being completed, while message sending & acknowledgement associated to the $1^{st}$ task is still not completed. In that case, the EoT_FIFO_full flag is set to true. The Syncbox internal FSM reflecting the node core status is switched to the ready state as soon as the end of task is detected and if the EndOfTask FIFO is not full.

The AsyncEvent input signal 444 of interface 440 allows asynchronous message transfers between two nodes. It is composed of N input signals, N being a generic parameter, specific to each implementation. With this interface, the node core can signal another node a specific event has occurred during the task processing time, even though the node is able to continue its execution without being blocked by this asynchronous event. The node core can additionally set a bit in an internal register (status register, error register, etc) to allow the destination node to detect what was the cause of the message: this register may then be accessed via the control input port 431 and via the LOCAL_CTL_IN port 445. Upon assertion of AsyncEvent input signal 444, async message generation logic 413 sends an asynchronous activation message. A specific register is dedicated to control the processing of assertion of AsyncEvent input signal 444; it is programmed at system initialization (at beginning of video frame decode or encode, for video codec systems) and contains information on the destination node HWA and task identifier to notify.

Acknowledge of Asynchronous Activation message is programmable at system set-up. Each AsyncEvent signal 444 has a status register AsyncAck set to 1 to indicate an acknowledge message is required, 0 otherwise. If no acknowledge message is requested, the corresponding AsyncEvent_ack signal 446 is asserted immediately after the asynchronous message has been sent: this enables the node task processor core 404 to assert several asynchronous events prior to the corresponding sent asynchronous activation messages are being processed by the destination node; this is possible because the secondary transmission's are not gated by previous acknowledge message reception. Async ack generation logic 416 asserts the AsyncEvent_Ack signal 446 of interface 440.

Figure 5:
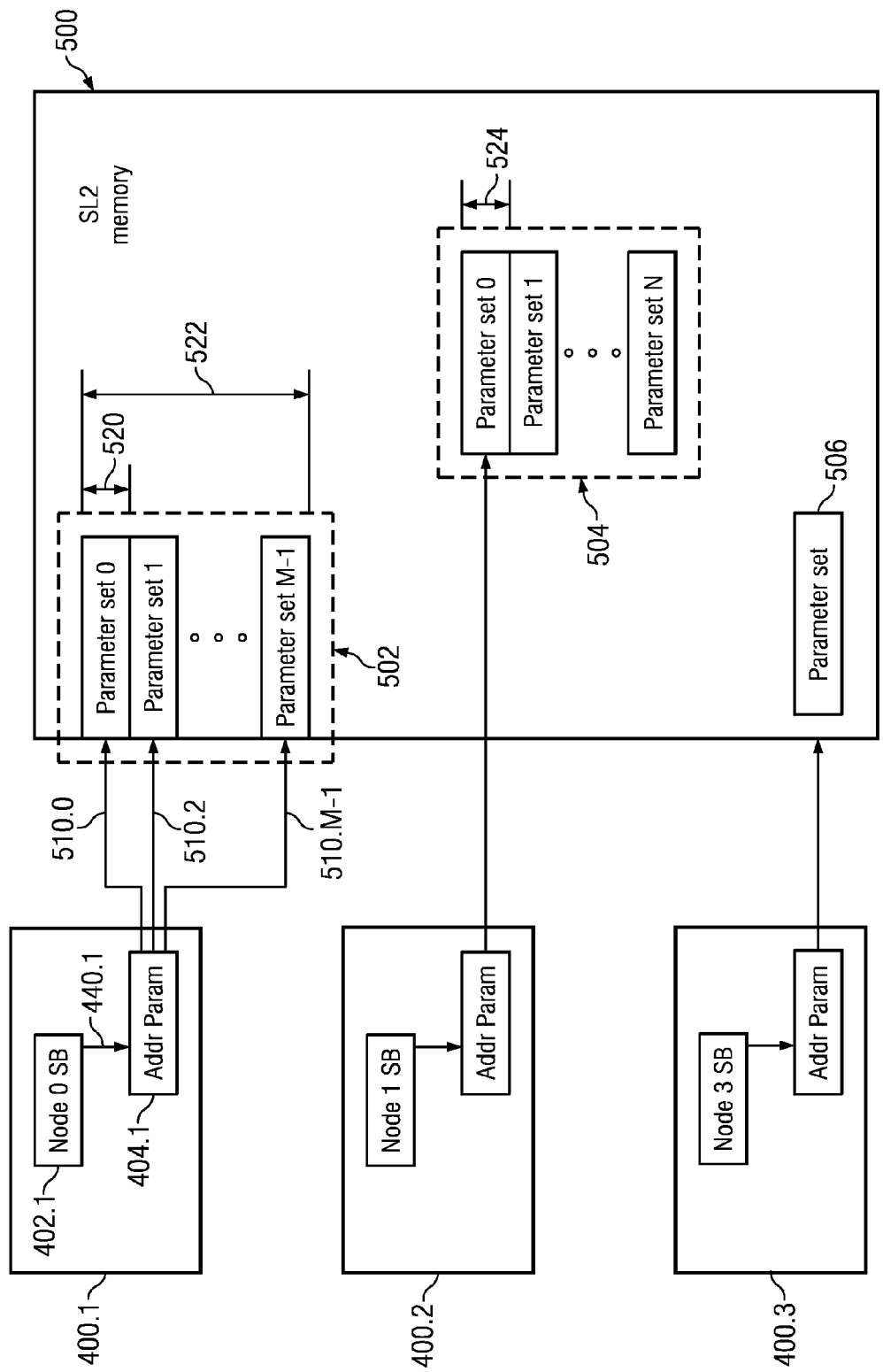
FIG. 5 is a schematic diagram illustrating operation of parameter addressing by the synchronization module of FIG. 4.

FIG. 5 is a schematic diagram illustrating operation of parameter addressing by the synchronization module of FIG. 4. In this schematic, nodes 400.1-400.3 are coupled to shared local memory 500. As described above, each node such a 400.1 includes a syncbox 402.1 and a task processor 404.1. The ParamAddr signals 426 of interface 440 are used to provide the task processor with a pointer to the configuration parameters which have been prepared and stored in the shared level 2 (SL2) memory 500. Configuration parameters are withholding references to data block memory locations for input/output/processing setting buffers, etc., basically all that is needed for the task processing. This pointer to the configuration parameters is referred to herein as the param_ID. For example, node 400.1 has associated parameter stack 502, node 400.2 has parameter stack 504 and node 400.3 has parameter stack 506. In this embodiment, the parameter address value is a 16 bit-pointer to a 128 bit-aligned SL2 address. It gives the offset into SL2 of the configuration parameters structure. The four lsbs are not part of the pointer value. For instance, the 16 bits address 0x0001 is corresponding to the byte address 0x0010, 0x0002 to 0x0020, and so on. Maximum SL2 space supported is then 1024 kB, i.e. 64 k of 128 bit words.

The param_ID is not part of the activation message. For pipelined type operations, multiple sets of parameters may be created, such as set 0-set M of parameter stack 502. Parameters are stored consecutively in memory, and each set of parameters for a given task are of the same size. The number of the different sets of parameters is programmed in a modulo counter (ParamAddr_Mod); it is usually at most equal to pipeline depth of a system as illustrated on FIG. 2. Each Syncbox has four dedicated registers per task located in parameter address generation logic 424. Two of them are programmable via the control input port 431. ParamAddr-Base register contains the pointer to the $1^{st}$ MB configuration parameter structure in the SL2 (16 bits). ParamAddr_Incr register contains the size of one configuration parameter structure (16 bits). ParamAddr_Incr is indicated at 520. The two other registers are computed by the address parameter generation logic 424. ParamAddr_Cnt register contains the index of the current configuration parameter structure (8 bits). ParamAddr register contains the pointer to the current MB configuration parameter structure in the SL2 (16 bits). In each syncbox, there is also one global register, common to all tasks: ParamAddr_Mod register contains the number of used configuration parameter structures (8 bits). ParamAddr_Mod is indicated at 522. The size of the above described registers are specific to one embodiment targeted at processing MB's in a video system as illustrated on FIGS. 1, 2, 6, 7, 8.

Note that each node of the system (and their associated syncbox) may have different programming for the above parameter addressing registers; these are usually dictated by the node core processing internal specificities, the actual use case run by the system and data dependency life time constraints between producer and consumer nodes in the pipelined system. For example, FIG. 5 illustrates a programming where parameter stack 502 has an increment size and modulo illustrated at 520, 522, while parameter stack 504 has a larger increment size 524. Parameter stack 506 has only a single set of entries because node 400.3 uses the same parameters for each execution of its task.

When a particular system operation, such as video coder/decoder (codec) is setup, ParamAddrBase register is initialized with the pointer value for the $1^{st}$ MB processing configuration parameter structure (MB #0). The ParamAddr_Mod register is set to the number of such structures. ParamAddr_Incr register is set to the size of such structures. When ParamAddrBase register is programmed, the current counter ParamAddr_Cnt is reset to 0 by the addr param generation logic 424. For every MB, the parameter address register is updated: ParamAddr=ParamAddrBase+(ParamAddr_Cnt*ParamAddr_Incr). ParamAddr register is exposed to the node core on interface 426 when the syncbox instructs for a new task to start via signal 441.

When the EndOfTask signal 442 is detected, the counter ParamAddr_Cnt is increased by 1 modulo the number of different context supported: ParamAddr_Cnt=(ParamAddrCnt+1) % (ParamAddr_Mod).

With the above scheme, an M MB pipeline depth example is depicted in FIG. 5. At system initialization, the node 0 ParamAddr base register is set to Node0 parameters ptr0 510.0, and ParamAddr_Cnt register is reset to 0 The parameter address modulo counter register (ParamAddr_Mod) is set to M. At $1^{st}$ activation of Node0, the ParamAddr register is equal Node0 parameters ptr0 510.0. At the EndofTask signal 442 assertion, the ParamAddr_Cnt register is increased (and equals to 1) and ParamAddr is updated to Node0 parameters ptr1 510.2. This enables to prepare upfront the to-come $2^{nd}$ activation of Node0 for which ParamAddr register will have the correct value at the activation message reception, therefore enabling to expose ParamAddr register content on task processor interface 440 as fast as possible together with the NewTask signal 441 assertion. At the $M^{th}$ activation of Node0, the ParamAddr_Cnt register equals to M−1, the ParamAddr register equals to parameters ptrM-1 510.M−1. At the $M+1^{th}$ activation of Node0, the ParamAddr_Cnt register is now equal to 0, so the ParamAddr register is back to the Node0 parameters ptr0 510.0 value. The ParamAddr base and ParamAddr_Incr registers of nodes 400.1-400.3 are initialized with values specific to each task.

In this manner, the syncbox may calculate parameter addresses for each task activation without needing any address information included in the activation message. This allows the activation message overhead to be small.

Figure 6:
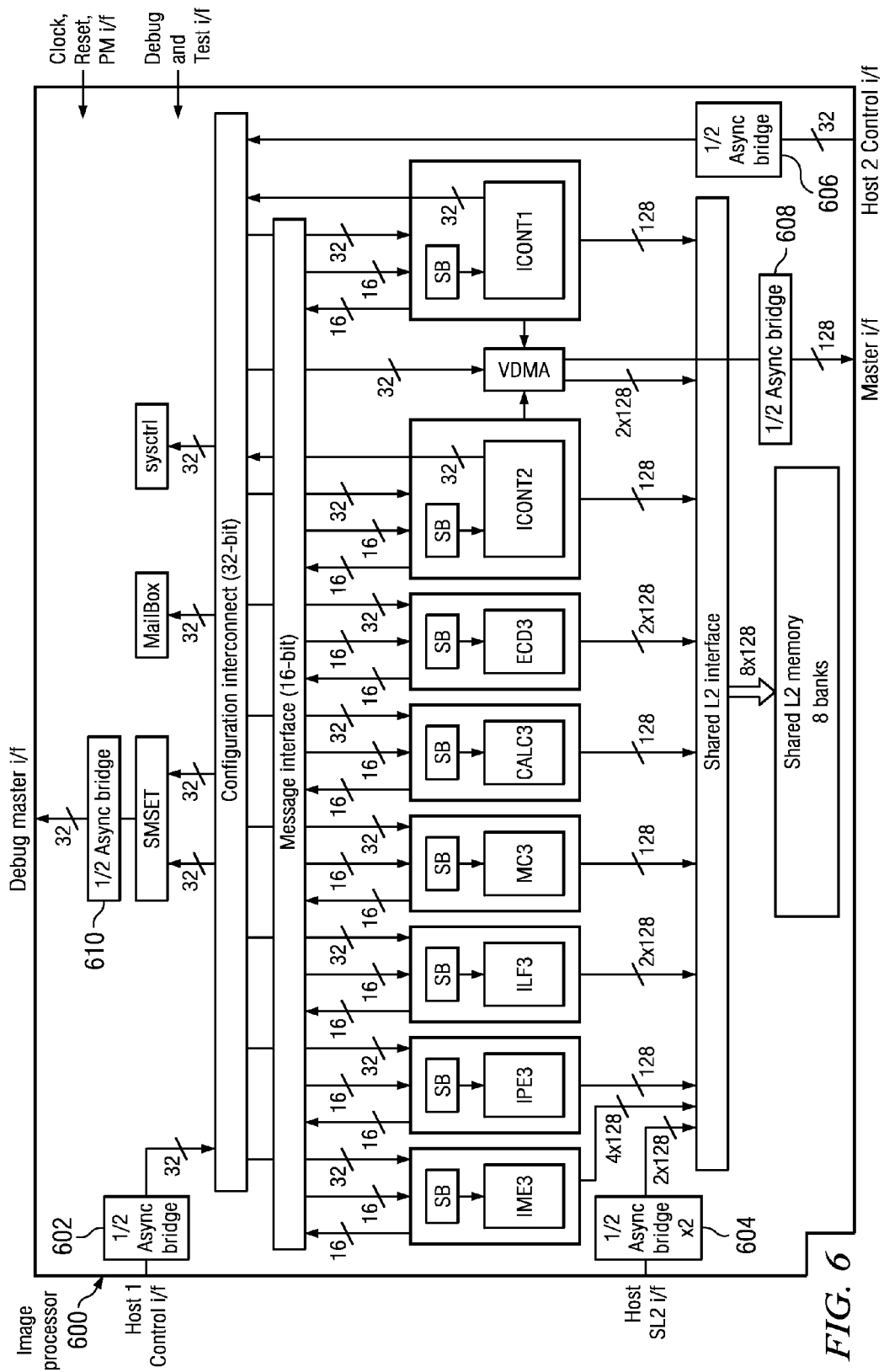
FIG. 6 is a block diagram of an exemplary system on a chip (SOC) that includes multiple synchronization modules for distributed synchronization.

FIG. 6 is a block diagram of an exemplary system on a chip (SOC) 600 that includes multiple synchronization modules for distributed synchronization. This exemplary system is intended for image and video processing; however, systems using multiple accelerators or processors coupled to syncboxes (SB) may be designed for many different types of data processing activities. In the exemplary system, there is a motion estimation (IME3) node, an intra-prediction estimator (IPE3) accelerator node, a loop filter (ILF3) accelerator node, a motion compensation (MC3) accelerator node, quantization and transform (CALC3) accelerator node, an entropy coder decoder (ECD3) accelerator node, and two control nodes (ICONT1, 2). Each control node includes a programmable processing unit and are configured to support multiple tasks, in this case six tasks. The other nodes are dedicated processing units that are configured to support two tasks, except for the IME3 and ILF3 nodes that each handle one task at a time. Each of these nodes includes a syncbox module, as described in more detail above. An understanding of the operating details of these nodes is not needed to appreciate the operation of the syncbox modules, and will therefore not be described further herein.

Each of the syncboxes are connected to the 16-bit message interface for passing activation and acknowledgement messages, as described above. Similarly, each of the syncboxes are also connected to the 32-bit configuration interconnect for receiving configuration information from a host processor, as described above. Host interface 602 and 606 are also coupled to the configuration interconnect to allow one or two external host processors to transfer data to the various nodes. Each of the nodes is also connected to the shared level 2 (L2) memory interface and thereby to the shared L2 memory, where parameters are stored, as described above. Host interface 604 is also connected to the to the shared L2 memory interface and thereby to the shared L2 memory to allow an external host to transfer data and parameters to the shared memory. A video bus direct memory access (VDMA) module is also connected to the shared L2 interface to transfer the video data in and out of the shared L2 memory for off-chip use. In this exemplary SOC, this VDMA module is coupled to the 2 controller nodes; it therefore interacts indirectly with the other nodes of the system which have syncbox modules. An alternative image and video processing system can have this vDMA module be coupled to a syncbox of its own.

A debug interface 610 is also provided to allow a debug host to access and control the system for debugging purposes.

System Examples

Figure 7:
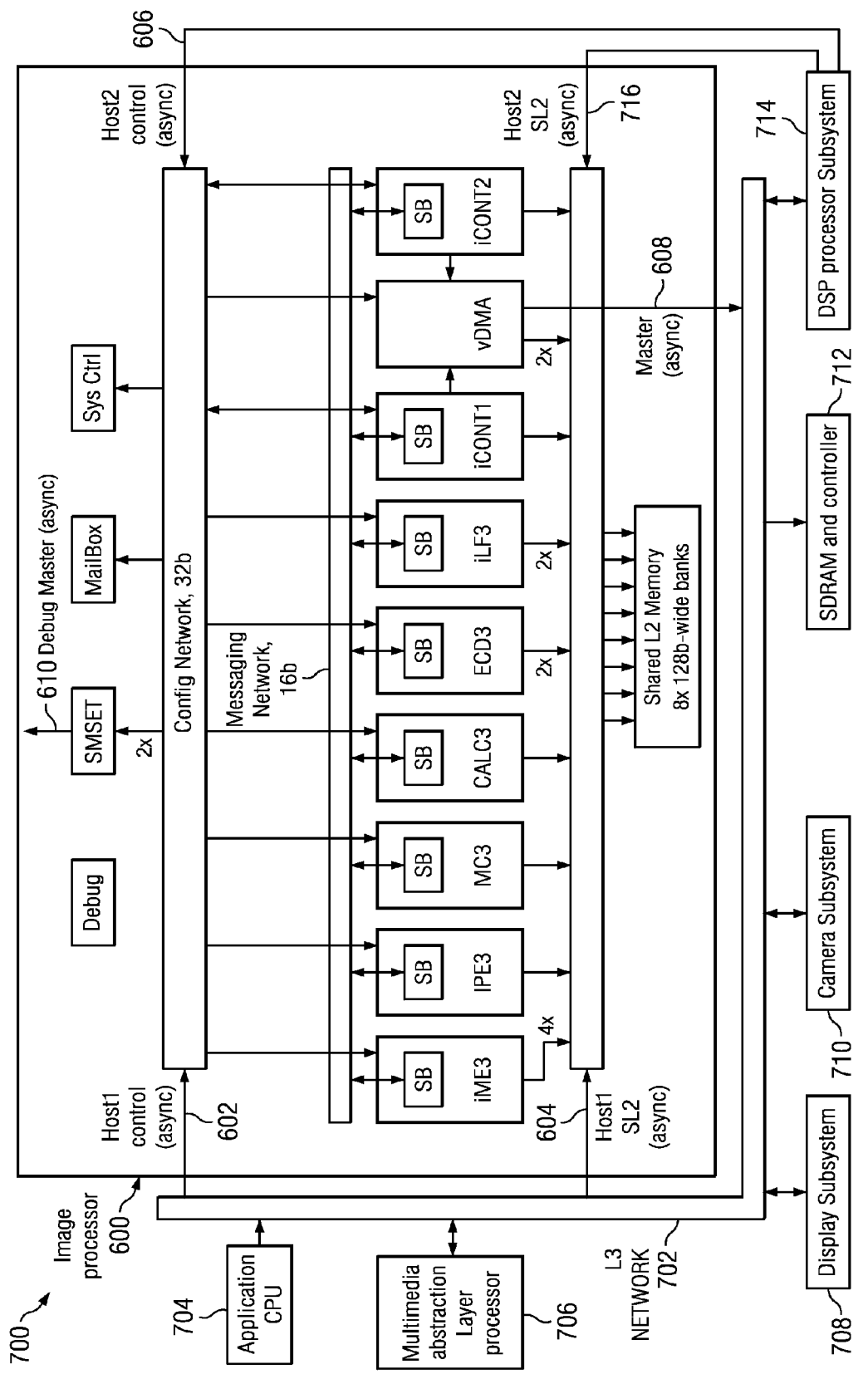
FIG. 7 is a block diagram of an exemplary system that includes the SOC of FIG. 6 with multiple synchronization modules for distributed synchronization.

FIG. 7 is a block diagram of an exemplary system 700 that includes SOC 600 of FIG. 6 with multiple synchronization modules for distributed synchronization. In this exemplary system, a level 3 (L3) network 702 is included to allow the various subsystems to communicate. In other embodiments of the invention, such a network is not required. An application CPU 704 connects to host i/f 602 via the L3 network to configure the various nodes. It also connects to the host i/f 604 via the L3 network to access the shared L2 memory for transferring parameters and data. The video DMA also connects to the L3 network via master i/f 608 for transferring video data on and off SOC 600.

A digital signal processor (DSP) subsystem 714 is connected to the configuration network via interface 606 and to the SL2 interconnect via interface 716 to allow the DSP to access and control the nodes and SL2 memory within SOC 600. The DSP may perform known signal processing on the data being produced by the accelerators of SOC 600, for example.

In this embodiment, a multimedia abstraction layer processor 706 is also coupled to SOC 600 via L3 network 702 manages various node processing tasks according to the type of media being processed.

A display subsystem 708 receives and displays images produced by SOC 600. A camera subsystem 710 captures images and provides image data to SOC 600 to be processed. A synchronous dynamic random access memory (SDRAM) and controller 712 are also coupled to the L3 network to provide storage for video and image data, along with programs and other data needed by the various processors.

Figure 8:
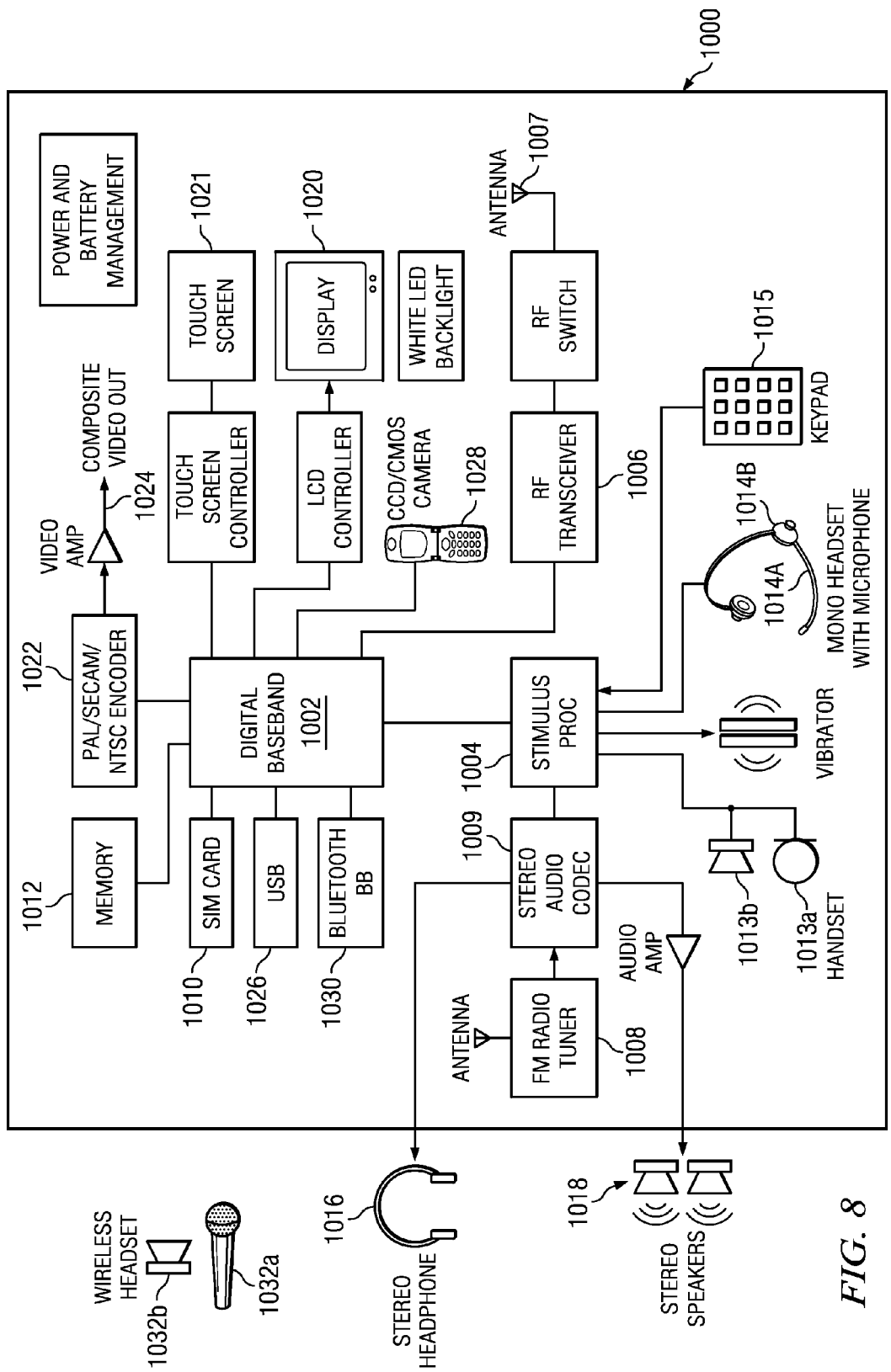
FIG. 8 is a block diagram of a mobile device that includes multiple synchronization modules for distributed synchronization during video processing.

FIG. 8 is a block diagram of a mobile device 1000 that includes multiple synchronization modules for distributed synchronization during video processing. In this example, mobile device 1000 is a mobile cellular phone that includes an embodiment of the present invention; however, embodiments of the invention may be useful in many types of systems, including: smart phones, portable media players, Internet tablets, digital still camera's having video record capabilities, television Set-up boxes and Media Centers, video surveillance systems, etc.

Digital baseband (DBB) unit 1002 includes multiple processing nodes each with a syncbox, similar to SOC 600, that operate as described in more detail above. It may also include a digital processing subsystem that includes embedded memory and security features. Stimulus Processing (SP) unit 1004 receives a voice data stream from handset microphone 1013*a* and sends a voice data stream to handset mono speaker 1013*b*. SP unit 1004 also receives a voice data stream from microphone 1014*a* and sends a voice data stream to mono headset 1014*b*. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1006 is a digital radio processor and includes a receiver for receiving a stream of coded data frames from a cellular base station via antenna 1007 and a transmitter for transmitting a stream of coded data frames to the cellular base station via antenna 1007. RF transceiver 1006 is coupled to DBB 1002 which provides processing of the frames of encoded data being received and transmitted by cell phone 1000.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032a and headset 1032b for sending and receiving voice data. DBB 1002 can also be connected to display 1020 and can send information to it for interaction with a user of the mobile UE 1000 during a call process. Touch screen 1021 may be connected to DBB 1002 for haptic feedback. Display 1020 may also display pictures received from the network, from a local camera 1028, or from other sources such as USB 1026. DBB 1002 may also send a video stream to display 1020 that is received from various sources such as the cellular network via RF transceiver 1006 or camera 1028. DBB 1002 may also send a video stream to an external video display unit via encoder 1022 over composite output terminal 1024. Encoder unit 1022 can provide encoding according to PAL/SECAM/NTSC video standards. In some embodiments, audio codec 1009 receives an audio stream from FM Radio tuner 1008 and sends an audio stream to stereo headset 1016 and/or stereo speakers 1018. In other embodiments, there may be other sources of an audio stream, such a compact disc (CD) player, a solid state memory module, etc.

As mentioned above, DBB 1002 Digital baseband (DBB) unit 1002 includes multiple processing nodes each with a syncbox, similar to SOC 600, that operate as described in more detail above. DBB 1002 uses the syncbox controlled multiple nodes to process the video and image data received from the camera, network and other sources to produce images and video for display on the internal display 1020 and also for generating the composite video output signal 1024. By using a syncbox that is coupled to each hardware accelerator within DBB 1002, a low overhead control structure is provided that minimizes the amount of processing effort required by the host processor that is also within DBB 1002.

Other Embodiments

Embodiments of the distributed synchronizers and methods described herein may be provided on any of several types of digital systems, for example: digital signal processors (DSPs), general purpose programmable processors, application specific circuits, or systems on a chip (SoC) such as combinations of a DSP and a reduced instruction set (RISC) processor together with various specialized accelerators.

Embodiments of the invention may be used in many types of systems that employ video encode/decode capabilities in some form or another in order to reduce synchronization control overhead for multiple hardware accelerators and processors.

Examples of such systems include, but are limited to
 Smart phones.
 Portable media player.
 Internet tablets.
 Digital still camera's having video record capabilities.
 Television Set-up boxes and Media Centers.
 Video Surveillance systems Embodiments of this invention may be used in many other domains besides video. For example, a modem subsystem can be built using such a synchronization engine for its sub-components to form a wireless modem, or a wireline modem. A database search engine may use an embodiment of the invention to synchronize and control multiple search nodes, for example. A real-time identification engine can be built using a synchronization engine for its sub-components which perform various sequential or parallel image/video post processing prior to data base criteria matching.

While the embodiments illustrated herein have a message network and a separate configuration network, other embodiments may use a same network for both messages and configuration setup.

Various configurations may be employed for the message and/or configuration network, such as different bit widths than described herein, different topologies, etc. The term "network" is not intended to convey any particular restriction to the type of interconnect, which may be a parallel bus, a serial single wire interconnect, etc.

A syncbox may be embodied in a number of ways; for example, a syncbox may be a discrete module that is coupled to a discrete task processor, or a syncbox may be a library module that is included in a design tool library and used to instantiate multiple syncbox modules coupled to task processors in a custom designed integrated circuit. All syncboxes in a given system may be embodied in a single integrated circuit or other substrate, or may be embodied in two or more integrated circuits that are then interconnected using network interconnections that may be signal traces on a substrate, signal conductors in cables, or wireless interconnection techniques. The interconnects may use ohmic connections, optical signals, or other known or later discovered conduction techniques.

Various aspects described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes an aspect may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A digital system comprising a synchronization module, wherein the synchronization module comprises:
    a network interface configured to send and receive messages to and from other synchronization modules;
    a task scheduler configured to select a task in response to one or more received message;
    a configuration interface configured to receive task information from a host processor;
    a task processor interface configured to initiate the selected task on a task processor coupled to the synchronization module; and
    parameter address generation logic, wherein the parameter address generation logic is configured to generate revised parameter addresses in response to receipt of successive activation messages by the network interface.

2. The digital system of claim 1, further comprising a plurality of synchronization modules coupled together, wherein the network interface of each synchronization module is coupled to a message network and the configuration interface of each synchronization module is coupled to a configuration network.

3. The digital system of claim 2, wherein the message network and the configuration network are a common network.

4. The synchronizer module of claim 1, wherein the parameter address generation logic comprises storage for a base address, an address increment amount, an increment count and an address rewinding amount in order to program linear or modulo address computations.

5. The digital system of claim 1, further comprising a task processor coupled to the synchronization module to form a hardware accelerator node.

6. The digital system of claim 5, further comprising a plurality of the hardware accelerator nodes, wherein the network interface of each synchronization module is coupled to a message network and the configuration interface of each synchronization module is coupled to a configuration network.

7. The digital system of claim 6, further comprising one or more shared memory, each coupled to at least a respective portion of the plurality of hardware accelerator nodes, wherein the one or more shared memories are accessible by each task processor of the respective portion of hardware accelerator nodes.

8. The digital system of claim 7, wherein the task processor of each of the portion of hardware accelerator nodes is configured to use the respective revised parameter address to access one or more of the shared memory.

9. The digital system of claim 6, wherein the plurality of hardware accelerator nodes are packaged in a single integrated circuit.

10. The digital system of claim 6, wherein the system is a mobile device, further comprising a display screen coupled to the plurality of hardware acceleration nodes, the plurality of hardware acceleration nodes being configured to process an image to be shown on the display screen.

11. A digital system comprising a plurality of hardware accelerator nodes, wherein each hardware accelerator node comprises a synchronization module coupled to a task processor, wherein each synchronization module comprises:
    a network interface configured to send and receive messages to and from other synchronization modules;
    a task scheduler configured to select a task in response to one or more received message;
    a configuration interface configured to receive task information from a host processor;
    a task processor interface configured to initiate the selected task on the task processor coupled to the synchronization module;
    wherein the network interface of each synchronization module is coupled to a message network and the configuration interface of each synchronization module is coupled to a configuration network; and
    wherein each synchronization module further comprises parameter address generation logic, wherein the parameter address generation logic is configured to generate revised parameter addresses in response to receipt of successive activation messages by the network interface.

12. The digital system of claim 11, further comprising one or more shared memory, each coupled to at least a respective portion of the plurality of hardware accelerator nodes, wherein the shared memories are accessible by each task processor of the respective portion of hardware accelerator nodes.

13. The digital system of claim 12, wherein the task processor of each of the portion of hardware accelerator nodes is configured to use the respective revised parameter address to access one or more of the shared memory.

14. A method for synchronizing a plurality of task processors, the method comprising:
    coupling a respective one of a plurality of synchronization modules to each task processor, wherein each task processor is configured to perform a task in response to a start signal from the coupled synchronization module;
    transmitting periodic activation messages among the plurality of synchronization modules, wherein each synchronization module is configured to start a task on its coupled task processor in response to receiving an activation message from another synchronization module when all dependency conditions for the task have been met, such that the activation messages are simple messages that do not contain parameter information for the task; and
    for a given synchronization module:
    storing parameter data for M activations of a task in storage accessible by the task processor coupled to the synchronization module;
    storing parameter address information within the synchronization module; and
    determining a storage location of stored parameters for each activation of a task in response to receiving each periodic activation message, wherein the storage location is determined by the synchronization module using the parameter address information stored within the synchronization module; and
    providing the determined parameter storage location to the task processor coupled to the synchronization module.

15. The method of claim 14, further comprising for the given synchronization module:
  receiving an indication from the coupled task processor each time it completes a task; and
  sending an activation message to a dependent synchronization module to indicate a dependency has been met.

16. The method of claim 15, further comprising for the given synchronization module acknowledging receipt of each activation message by sending an acknowledgement message to the originating synchronization module.

17. The method of claim 16, further comprising for the given synchronization module signaling an error if an acknowledgement message is not received for each activation message sent.

18. A method for synchronizing a plurality of task processors, the method comprising:
  coupling a respective one of a plurality of synchronization modules to each task processor, wherein each task processor is configured to perform a task in response to a start signal from the coupled synchronization module;
  transmitting periodic activation messages among the plurality of synchronization modules, wherein each synchronization module is configured to start a task on its coupled task processor in response to receiving an activation message from another synchronization module when all dependency conditions for the task have been met, such that the activation messages are simple messages that do not contain parameter information for the task; and
  sending an asynchronous message from one of the plurality of synchronization modules to indicate a blocking exceptional event happening during the course of a task execution and which must be processed before the current task is continued.

* * * * *